UNITED STATES PATENT OFFICE.

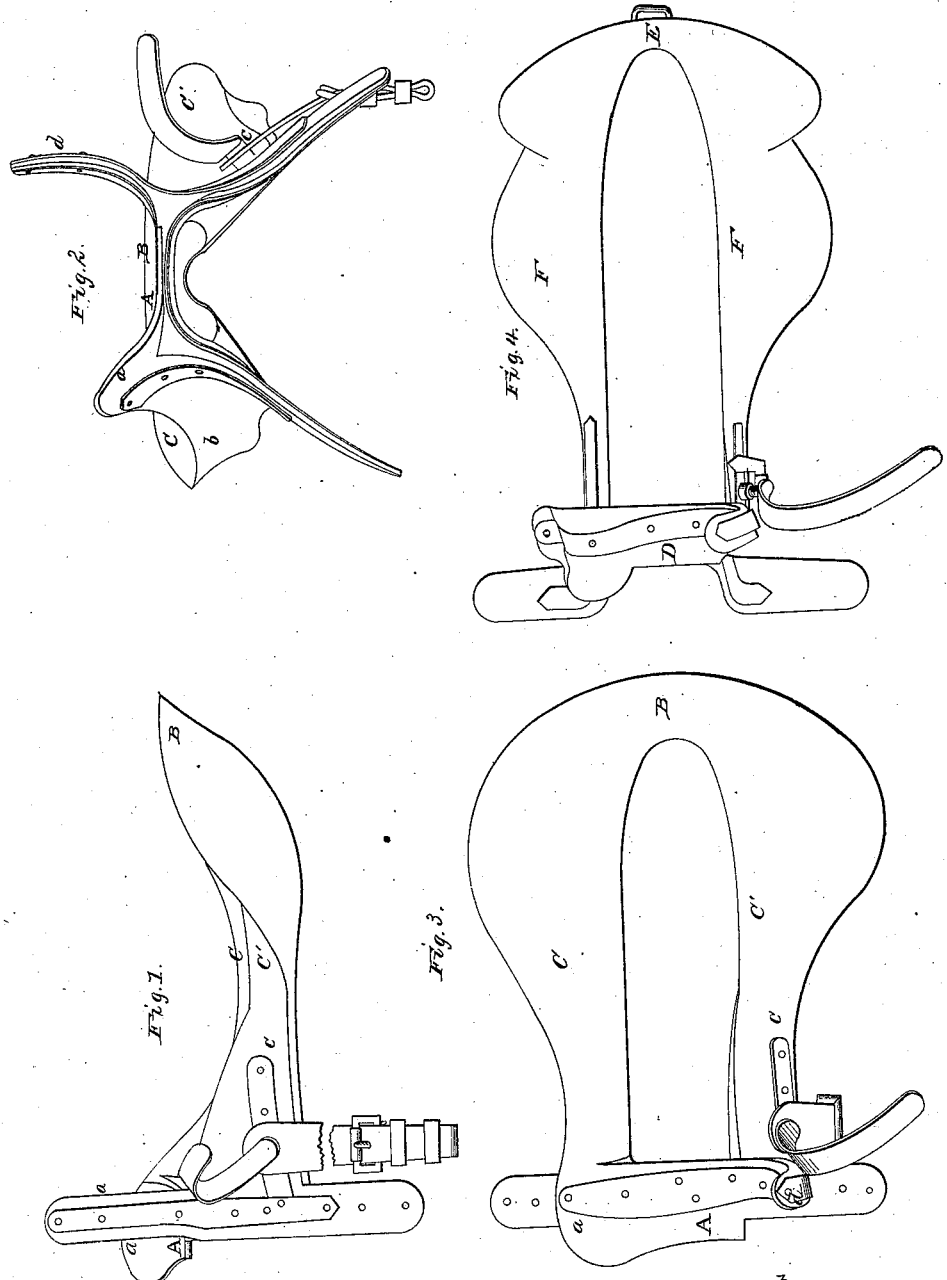

WILLIAM HILL, OF NEW YORK, N. Y.

IMPROVEMENT IN SIDE-SADDLE TREES.

Specification forming part of Letters Patent No. 40,691, dated November 24, 1863.

*To all whom it may concern:*

Be it known that I, WILLIAM HILL, of the city, county, and State of New York, have invented a new and useful Improvement in Side-Saddle Trees; and I do hereby declare that the following is a full, clear, and exact description of the same, reference being had to the accompanying drawings, making a part of this specification, in which—

Figure 1 is a side view of my invention; Fig. 2, a front view of the same; Fig. 3, a plan or top view of the same; Fig. 4, a plan or top view of an ordinary tree as at present constructed.

Similar letters of reference indicate corresponding parts in the several figures.

This invention consists in constructing the tree in such a manner that it will give the required form to the seat of the saddle, and the labor of "building up" or stuffing the tree, in order to get the proper form, dispensed with.

In constructing side-saddles with the ordinary trees considerable labor is necessarily expended in building up or stuffing the tree, and skillful and tasty mechanics are required in order to produce good work. In fact, much depends upon the taste of the mechanic, as the eye is the only guide by which the proper shape or form may be given the seat of the saddle. By my invention the tree itself gives the form of the seat, and the former requires only to be padded and covered in order to form the saddle.

To enable those skilled in the art to fully understand and construct my invention, I will proceed to describe it.

A, Figs. 1, 2, and 3, represents the pommel, B the cantle, and C C' the side pieces of the tree, of the side saddle. The pommel A at the right hand side of the saddle does not terminate in a horn, as heretofore, but is gently curved upward, as shown at *a*, and the side piece, C, which extends from *a* to the cantle B, is curved longitudinally, so as to have a concave upper surface, and it is made of beveled form on its outer edge, extending upward, as shown at *b* in Fig. 3, the back end of C and the cantle B being united in such a manner as to form a continuous piece, and of the same form as is desired to be given the upper right-hand part of the seat of the saddle. The other side piece, C', at its back part adjoining the cantle B is nearly of the same form as the side piece, C, but the front part of C', from about its center to the pommel A, is curved downward in a transverse direction from its inner to its outer edge, as shown at *c*. The pommel A is provided with the usual left-hand horn, *d*. The upper surface of the side piece, C, is a trifle lower than the upper surface of C', in order to throw the right-hand side of the seat a little down to obviate the tendency of the rider to slip off from the stirrup side of the saddle. The form of the upper surface of the tree corresponds precisely to the desired form of the seat of the saddle. The ordinary tree, which is shown in Fig. 4, is simply a frame, which does not conform to the desired shape of the seat of the saddle. The pommel D and cantle E are of the desired form, or approximate thereto, but the side pieces, F F, are curved downward in a transverse direction from their inner to their outer edges, and do not serve to give any idea of the shape of the seat, nor are they connected to the cantle so as to form continuous pieces therewith. This tree, therefore, requires to be built up—that is to say, covered with layers of padding or stuffing—so as to give the desired form to the seat of the saddle. It will be seen, therefore, that by my invention this labor of building up or stuffing is avoided, because the shape or form of the seat is obtained by the tree itself. The latter is therefore simply padded sufficiently to produce a soft or easy seat and then covered with leather. I do not, however, claim, broadly, the general idea of constructing saddle-trees of the form desired for the finished seat.

I would remark that my improved tree is constructed of wood, and properly ironed in order to render it strong and durable.

Having thus described my invention, what I claim as new, and desire to secure by Letters Patent, is—

A side saddle tree having its side pieces, C C', pommel A, and cantle B constructed, arranged, and combined in the manner as herein shown and described.

WILLIAM HILL.

Witnesses:
M. S. PARTRIDGE,
DANIEL ROBERTSON.